United States Patent
Vartak et al.

(10) Patent No.: US 10,976,712 B2
(45) Date of Patent: Apr. 13, 2021

(54) METHOD AND SYSTEM TO PROVIDE COST OF LOST OPPORTUNITY TO OPERATORS IN REAL TIME USING ADVANCE PROCESS CONTROL

(71) Applicant: Honeywell International Inc., Morris Plains, NJ (US)

(72) Inventors: Mandar Vartak, Bangalore (IN); Chris Webb, Scottsdale, AZ (US); Michael Niemiec, Dexter, MI (US); Sriram Hallihole, Bangalore (IN); Andrew John Trenchard, Romsey (GB); Sanjay Dave, Bangalore (IN); Matt Grizzle, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 370 days.

(21) Appl. No.: 15/888,822

(22) Filed: Feb. 5, 2018

(65) Prior Publication Data

US 2019/0243319 A1 Aug. 8, 2019

(51) Int. Cl.
| | | |
|---|---|---|
| *G05B 13/00* | (2006.01) | |
| *G05B 13/04* | (2006.01) | |
| *G06Q 10/06* | (2012.01) | |

(52) U.S. Cl.
CPC ........... *G05B 13/042* (2013.01); *G05B 13/00* (2013.01); *G05B 13/048* (2013.01); *G06Q 10/0635* (2013.01)

(58) Field of Classification Search
CPC ...... G05B 13/22; G05B 13/00; G05B 13/042; G05B 23/0254; G05B 13/048; G06Q 10/06393; G06Q 10/0635
See application file for complete search history.

(56) References Cited

U.S. PATENT DOCUMENTS

| | | | |
|---|---|---|---|
| 6,038,540 A * | 3/2000 | Krist | G05B 13/00 705/7.33 |
| 7,421,374 B2 | 9/2008 | Zhan et al. | |
| 2002/0123864 A1* | 9/2002 | Eryurek | G05B 23/0254 702/188 |
| 2007/0168057 A1* | 7/2007 | Blevins | G05B 13/022 700/53 |
| 2009/0198350 A1* | 8/2009 | Thiele | G05B 13/042 700/30 |
| 2014/0344007 A1* | 11/2014 | Shende | G06Q 10/0635 705/7.27 |
| 2018/0032940 A1* | 2/2018 | Trenchard | G06Q 10/06393 |

* cited by examiner

*Primary Examiner* — Kandasamy Thangavelu
(74) *Attorney, Agent, or Firm* — Seager, Tuffe & Wickhem, LLP

(57) ABSTRACT

A field device, method, and non-transitory computer readable medium provide for cost of lost opportunity to operators in real-time using an advance process control. The field device includes a memory and a processor operably connected to the memory. The processor receives current values and average values for controlled variables and manipulated variables; determines costs of lost opportunity for each of controlled variable variance issues, limit issues, model quality issues, inferential quality issues, and variable model issues based on the current values and the average values of the controlled variables; and stores the costs of lost opportunity for the field device.

20 Claims, 4 Drawing Sheets

FIG. 2A

| | cdu1 - Profit Suite Operator Station | | | | | | | | | □ ☒ |
|---|---|---|---|---|---|---|---|---|---|---|
| | | | | | | | | | | Honeywell |
| 🖧 cdu1  🖧 cdu2 | | | | cdu1 | | | | | | 🏠 ⓘ ⓘ |
| 🖧 debut  🖧 splitter | | | | CONTROLLER OFF  SIMULATION | | | | | | |
| oper_def_template ⌄  🗐 | | | ON  OFF  WARM | 🗐 0 ⓘ 13 | △ View ⌄ | More ⌄ | | | | 🔍 ⚙ |

| Controller | CV | MV | DV | My View | FAQs | Configuration | | | | |
|---|---|---|---|---|---|---|---|---|---|---|
| Summary | Detail | Optimize | Control | Process | Adv Tuning | GainDelay | | | | |
| Filter ⌄ | Custom ⌄ | ⬆ Hide | ⬆ Unhide ⌄ | Hidden Row Status | ⬢° Normal ⌄ | ⬢° Nearing ⌄ | <NoMessage> ⌄ | ⬢° Optimize ⌄ | ⬢° Violating ⌄ | |
| 215 | 220 | 225 | | 230 | 235 | 240 | 245 | 250 | | |
| CV# | CV Name | CV Description | | Status | Value | SS Value | Low Limit | High Limit | | |
| 1 | cdu1ai01.pv | Naphtha 95% Pnt | | GOOD | 357.96 | 357.86 | 330.00 | 355.00 | | |
| 2 | cdu1ai02.pv | Overflash flow | | GOOD | 132.07 | 132.27 | 135.00 | 151.00 | | |
| 3 | cdu1ai03.pv | Chg. Heater COT | | GOOD | 500.80 | 500.69 | 450.00 | 490.00 | | |
| ▲ 4 | cdu1ai04.pv | Splitter reflux valve | | GOOD | 185.46 | 185.49 | 170.00 | 201.00 | | |
| 5 | cdu1ai05.pv | LGO D86 90% Pnt | | GOOD | 610.14 | 610.03 | 600.00 | 623.00 | | |
| 6 | cdu1ai06.pv | HGO Draw Temp | | GOOD | 646.07 | 646.17 | 650.00 | 670.00 | | |

Lost opportunity cost

☐ Limit Issues  ☐ Variability  ☒ Soft Sensors  ☒ Variables dropped

Chg. Heater Skin Temp limit 12°F < Benchmark
Chg. Heater COT limit 20°F < Benchmark
Variance on overflash flow
Naphtha 95% Soft Sensor performance ± 4.2°F
Splitter reflux valve in manual (long term)

View All   May 2, 2017

K$/yr   1 2 3 Next

Engr ⌄

METHOD AND SYSTEM TO PROVIDE COST OF LOST OPPORTUNITY TO OPERATORS IN REAL TIME USING ADVANCE PROCESS CONTROL

TECHNICAL FIELD

This disclosure relates generally to advance process control (APC) sensors. More specifically, this disclosure relates to methods and systems to provide cost of lost opportunity to operators in real time using advance process control.

BACKGROUND

Advance process control (APC) is used in the process industry to drive complex systems that are interactive with transport delay to operate at limits and deliver operational performance and economic benefits to customers. Sustaining the performance of the controllers is important for realizing the benefits that these applications promise. The performance of an APC application deteriorates over time due to equipment degradation, changes in the operations of the process and of the controller, constrained APC limits, variables dropped from APC and various other reasons.

SUMMARY

This disclosure provides for determining cost of lost opportunity to operators in real-time using an advance process control.

In a first embodiment, a field device including a memory and a processor operably connected to the memory is provided. The processor receives current values and average values for controlled variables and manipulated variables; determines costs of lost opportunity for each of controlled variable variance issues, limit issues, model quality issues, inferential quality issues, and variable model issues based on the current values and the average values of the controlled variables; and stores the costs of lost opportunity for the field device.

In a second embodiment, a method for a field device is provided. The system includes receiving current values and average values for controlled variables and manipulated variables; determining costs of lost opportunity for each of controlled variable variance issues, limit issues, model quality issues, inferential quality issues, and variable model issues based on the current values and the average values of the controlled variables; and storing the costs of lost opportunity for the field device.

In a third embodiment, a non-transitory computer readable medium is provided. The computer readable medium machine-readable medium is encoded with executable instructions that, when executed, cause one or more processors to receive current values and average values for controlled variables and manipulated variables; determine costs of lost opportunity for each of controlled variable variance issues, limit issues, model quality issues, inferential quality issues, and variable model issues based on the current values and the average values of the controlled variables; and store the costs of lost opportunity for the field device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 2A and 2B illustrate an exemplary interface for providing cost of lost opportunity to operators in real time using advance process control according to this disclosure.

DETAILED DESCRIPTION

Figure 1:
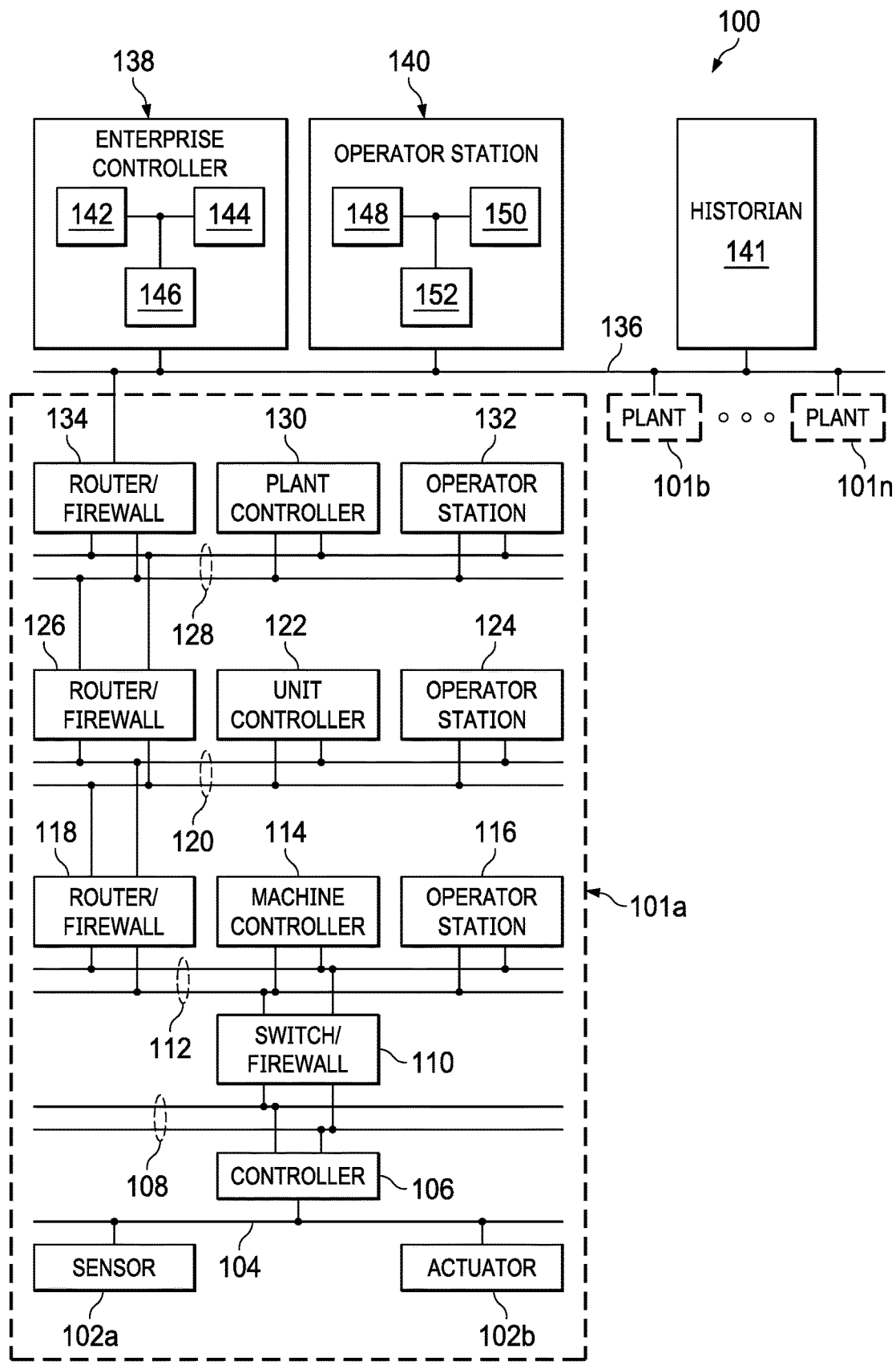
FIG. 1 illustrates an example industrial control and automation system according to this disclosure.
Figure 2B:
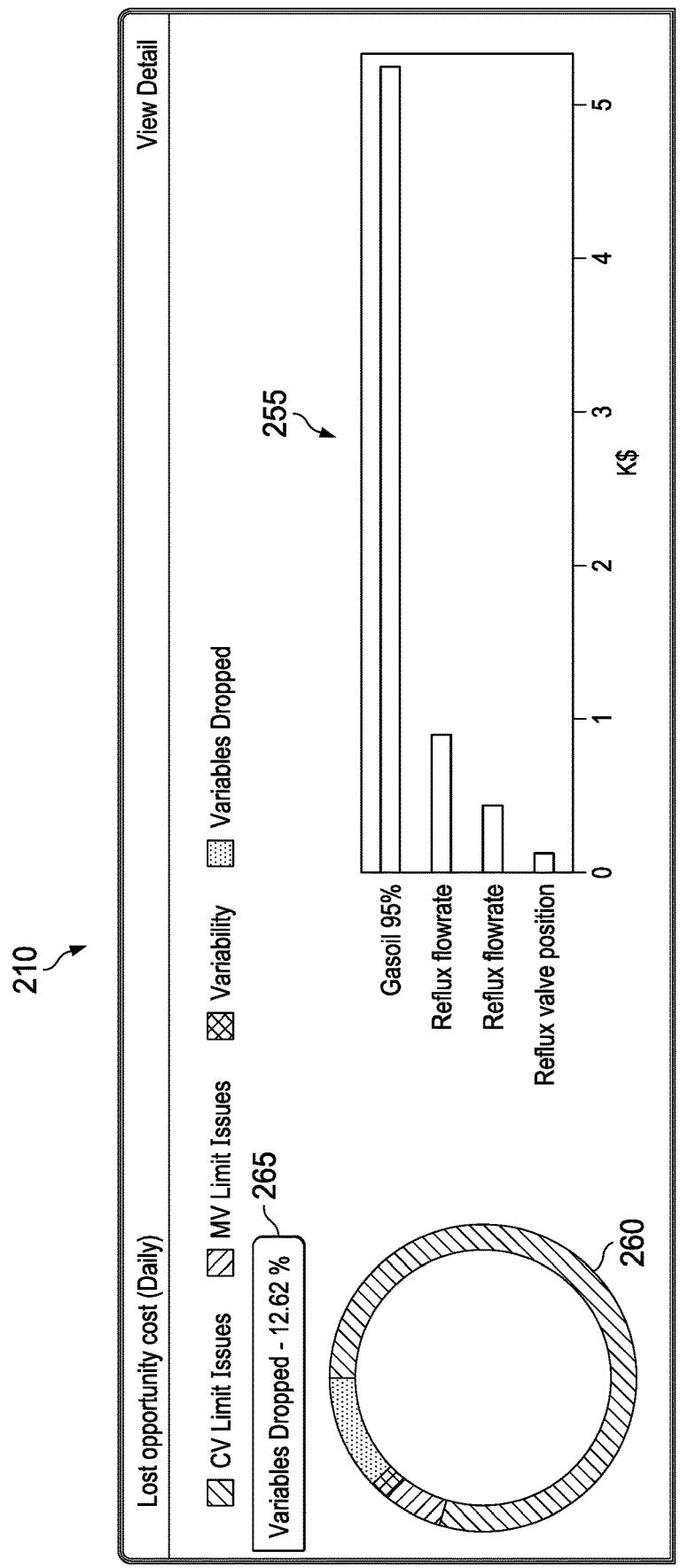
Figure 3:
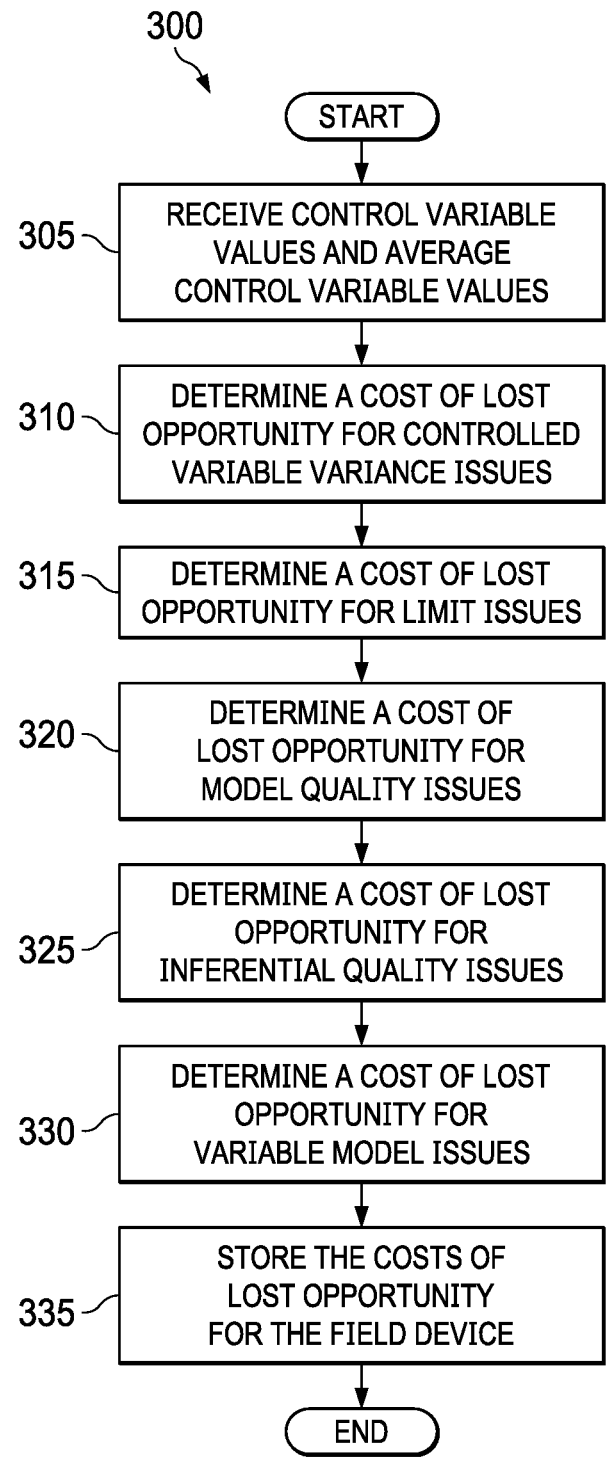
FIG. 3 illustrates an example method for providing cost of lost opportunity to operators in real time using advance process control according to this disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

Embodiments of this disclosure provide benefits of limiting issues in an APC. The APC calculates the cost of lost opportunity due to incorrect, over constrained, or equipment size limits of manipulated variables (MVs) and/or controlled variables (CVs).

The disclosed embodiments provide benefits of increasing model quality. The APC calculates the lost opportunity due to model quality issues. The process is nonlinear and time variant, while the models of APC are typically linear time invariant (LTI). The controller dynamic response and embedded optimizer solution gets affected when the process drifts due to change in feed quality, operating point, ambient condition and other operating conditions.

The disclosed embodiments provide benefits of increasing inferential quality. The APC calculates the lost opportunity due to inferential quality issues. Soft sensors or inferred properties are quite frequently used as controlled variables in APCs as proxies to the lab or analyzer values. Many of these inferred properties limits or quality specifications are frequently constraints to the optimization. Therefore, the quality of the inferential has direct impact on the benefits that can be achieved by APCs.

The disclosed embodiments provide benefits of monitoring dropped variable modes. The APC calculates the cost of lost opportunity when some of the variables are excluded or dropped from the APC. Due to various transient issues, operators may remove some of the variables from consideration of the controller. In some embodiments, the variables may be removed from the controller for an extended period of time. The controller operation in such conditions becomes sub optimal.

The disclosed embodiments provide benefits of optimization configuration. In many APC applications, the costs of variables for optimization or objective coefficients do not represent real costs. These costs are entered to give just a direction to the variables. Even when costs entered are real, they may not be updated with the changes in market value or changes in mode of operation. This may result in an optimizer not targeting the true optimum value.

The disclosed embodiments provide benefits of reduced noise and variance of controlled variables. The noise or variance in controlled variables can be a result of measurement noise, underlying MV PID controller oscillations or can be due to high variance in measured or unmeasured disturbance variables. In some embodiments, high variance can also be due to mismatch between controller model and process and when the APC is tuned aggressively. Mismatch may also be due to nonlinearity that may result in limit cycling of the controller. One of the impacts of high noise and variance is that the APC pushes the average value of controlled variables away from the limits in order to maintain the CVs within limits. This causes loss of opportunity.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, flow rate, or a voltage transmitted through a cable. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS (FF) network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

In accordance with this disclosure, various components of the system 100 support a process for providing cost of lost opportunity to operators in real time using advance process control in the system 100. For example, one or more of the interfaces 146, 152 could indicate different aspects of a system where the process controls are not operating with maximum efficiency, as described in greater detail below.

Although FIG. 1 illustrates one example of an industrial process control and automation system 100, various changes may be made to FIG. 1. For example, a control system could include any number of sensors, actuators, controllers, servers, operator stations, and networks. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs.

FIGS. 2A and 2B illustrate an exemplary interface 200 for providing cost of lost opportunity to operators in real time using advance process control according to the various embodiments of the present disclosure. The embodiments of the interfaces illustrated in FIGS. 2A and 2B are for illustration only. FIGS. 2A and 2B do not limit the scope of this disclosure to any particular implementation.

The interface 200 includes a table 205 and a visual representation 210. The interface 200 provides a real-time understanding of the field device or system being monitored for lost opportunity costs. The interface 200 can further provide the ability to adjust the field device or system according to the cost of lost opportunity.

The table 205 includes a CV number 215, a CV name 220, a CV description 225, a CV status 230, a CV value 235, a CV SS (steady state) value 240, a CV low limit 245, and a CV high limit 250, for examples among other variables. The table 205 allows the user to both view the current status and values for the CVs and also to adjust values in both predictive modeling and actual operating adjustments.

The CV number 215 is a number associated with a CV for purposes of ordering and linking to a storage. The CV name 220 is the part number or file link associated with the CV in the interface and the CV description 225 provides a semantic name to the CV for identification by the user. The CV status 230 provides the user with the operating status of each CV. The CV value 235 is the current operating value of the CV. The CV SS value 240 is the CV steady state value. The CV low limit 245 is the low end of a range of acceptable current values for the CV. The CV high limit 250 is the high end of the range of acceptable current values for the CV.

The visual representation 210 includes one or more charts, such as a bar chart 255 and a doughnut chart 260. The visual representation 210 of the interface 200 provides an easily discernable representation of the total amount of lost opportunity costs and the significance of each type of lost opportunity costs. The visual representation also adjusts in real-time to indicate changes in the lost opportunity costs. The charts illustrated in the visual representation of FIG. 2A are percentages of the lost opportunity costs, but could also be represented using actual loss values.

The visual representation 210 could also include pop-up windows 265 that include more detailed information about each lost opportunity cost. The pop-up window 265 could be generated when the user selects a specific cost opportunity in the table 205 or by selecting or hovering over a specific portion of a chart.

Operators are responsible to use APC effectively to drive the process unit to the optimal operating targets. There is no standard mechanism to measure the performance of the process unit and how far the performance is from the optimal operation of the process unit. Operators need to know the answers to the following questions, as examples of questions, in real time to take corrective actions to drive their process units to optimal operating targets:

Is my process unit running at optimal operating conditions? Which variables are causing sub-optimal performance of my process unit and why? What should I do to fix the loss of performance of my process unit?

Process units sometimes undergo temporary changes due to preventive maintenance activities such as providing bypass while a valve is being repaired. Operators make changes in the APC application such as a limit change or drop a variable from the APC to account for these process changes. These temporary changes in the APC application are not reverted back to optimal operating targets due to lack of communication during shift handovers or otherwise. This limits maneuverability of variables in the APC application resulting in sub-optimal performance.

Thus, there is a need to measure performance of the process unit and provide corrective actions to operators in real time.

A process for determining cost of lost opportunity is executed at regular intervals. It identifies various APC issues and provides the economic value of loss. It also provides the corrective action to address the issue. This information is provided to operators in real time.

If a temporary change in the APC application configuration is not reverted back to the optimal configuration, then the cost of lost opportunity algorithm can flag it as an issue and provide the economic value of the loss associated with the issue. This drives operators to take corrective actions irrespective of which shift the operator belongs to.

This solution is vendor neutral and hence can be applied in any process unit where some vendor APC is running.

The method to calculate the cost of lost opportunity is to run a shadow optimizer at regular intervals. The data which is required for running the optimizer would be largely the same data as the one which is required for the advanced controller. In addition to the advanced controller data and gain matrix, it would require ideal limits of the variables. Ideal limits can be sourced from boundary management software which defines the operating envelope. Ideal limits can also be sourced from initial benefit study used to justify APC.

A sample screenshot of interface 200 is shown highlighting visualization of cost of lost opportunity of variables in an APC controller. The doughnut chart 260 shows how much economic loss is associated with different types of issues such as limit issues, variables dropped issues, etc. The bar chart 255 lists the top five variables that cause sub-optimal performance of an APC controller and how to fix it.

Economic optimization (EO) (also referred to as the optimizer or economic optimizer), which is solved in an APC, can be obtained by satisfying the following equation.

$$EO = \min \frac{1}{2} \|\varphi\|_2^2$$

where $$\varphi = \sum_i \alpha_i * (y_i - y_{io})^2 + \beta_i * y_i + \sum_j \alpha_j * (u_j - u_{jo})^2 + \beta_j * u_j$$

subject to:

$$y_{li} \leq y_i \leq y_{hi}$$

$$u_{lj} \leq u_j \leq u_{hj}$$

The method to calculate the cost of lost opportunity is to run a shadow optimizer at regular intervals. The optimizer can be run on premise or in the cloud. The data that is required for running the shadow optimizer would be largely the same data as the one that is required for the advanced controller. In addition to the advanced controller data and gain matrix, the following data would be required:

Prices of feeds, products, raw materials and utilities at the boundary of the plant. Prices can be sourced from the ERP.

Ideal limits of the variables. Ideal limits can also be sourced from boundary management software that defines the operating envelope. The ideal limits are sourced from the initial benefit study used to justify the APC.

The shadow optimizer is set up as a product value optimizer (PVO). PVO refers to optimization when true process economics are directly entered into the controller in either independent variables or dependent variables. The shadow optimizer may need to be augmented with additional controlled variables if the original controller is not designed as a PVO.

FIG. 3 illustrates an example method for providing cost of lost opportunity to operators in real time using advance process control according to this disclosure. The process depicted in FIG. 3 is described as being performed in conjunction with the controller 106, processing device 142, or processing device 148 illustrated in FIG. 1.

In operation 305, the controller 106 receives current values and average values for controlled variables and manipulated variables of the field device. The controller 106 can control different sensors to perform readings of the controlled variables or processing devices 142 and 148 can receive the values from the field device.

In operation 310, the controller 106 determines a cost of lost opportunity for controlled variable variance issues. This cost of lost opportunity is a portion of a calculation of cost of lost opportunity due to limit issues. This operation also can b e used calculate the cost of loss, if any, due to wrong configuration of the optimizer in the advance process controller and also calculate the cost of lost opportunity due to noise and variability in controlled variables.

The controller 106 determines an operating object function value based on real prices and data and limits collected from the field device. The controller 106 determines a steady state object function value based on adjusting the controlled variables in a manner that an average value is equal to a steady state value for each of the controlled variables. The controller 106 determines the cost of lost opportunity for controlled variable variance issues based on a difference between the steady state object function value and the operating object function value.

The cost of lost opportunity can be calculated using the shadow optimizer as described above. The controller values can be read in the shadow optimizer. The values can be hourly average values or collected at higher or lower frequency with or without the averaging.

The current optimizer object function value or operating object function value, $\varphi_i$ is determined with the real prices and the data and limits collected from the plant. In certain embodiments, a difference in steady state (SS) values of controlled variables and average values of controlled variables can vary. Large differences between the two values can indicate loss of opportunity due to variance issues.

The average value of each CV is changed to the SS value and the steady state objective function value, $\varphi_s$, is recalculated after each change.

The difference between $\varphi_i$ and $\varphi_s$ of the first CV indicates the loss of opportunity due to that CV and subsequent change in $\varphi_s$ can indicate loss of opportunity due to variance in a respective CV.

In operation 315, the controller 106 determines a cost of lost opportunity for limit issues. The controller 106 determines an economic object function value subject to a controlled or manipulated variable range limit. The controller 106 determines a limit issues object function value by perturbing each end of the controlled or manipulated variable range limit for each variable. The controller 106 determines the cost of lost opportunity for limit issues based on a difference between the limit issues object function value and the economic object function value.

Running the optimizer reports the new objective function value, $\varphi_o$. The difference between final $\varphi_s$ and $\varphi_o$ is the cost due to optimization configuration issue.

The controller 106 perturbs the limits in constraint to the ideal limit and solve the optimizer to calculate the optimized objective function value, $\varphi_k$, at each perturbation. The difference between $\varphi_k$ and $\varphi_o$ is the loss due to the kth limit. Revert the limit back to the original value after each perturbation.

The controller 106 can store the result of loss due to optimizer configuration issue and loss due to the kth limit against the name of the variable. Store the result of loss due to limit analysis of each variable against the name of the variable.

In operation 320, the controller 106 determines a cost of lost opportunity due to model quality issues. The controller 106 determines an economic objection function value subject to a controlled and manipulated variable range limits. The controller 106 determines the actual gains in the field device. The controller 106 determines a model quality object function value based on the actual gains. The controller 106 determines the cost of lost opportunity for model quality issues based on a difference between the model quality object function value and the economic object function value.

Model quality issue can be quantified by first determining the model error. The method described in Apparatus and method for analyzing model quality in a process control environment (U.S. Pat. No. 7,421,374), which is hereby incorporated by reference, can be used for determining the actual gains in the advanced controller.

The gains or gain multipliers thus obtained are inserted in the shadow optimizer model matrix.

The shadow optimizer is solved to determine the optimized objective function value or model quality object function value, $\varphi_m$, when the model quality is correct. During this optimization run the limits are kept as read from the plant so that quantification is independent of the limit issues to avoid double dipping.

The difference between $\varphi_m$ and $\varphi_o$ would be cost of lost opportunity due to model quality and is recorded by the controller 106 in operation 335.

In operation 325, the controller 106 determines a cost of lost opportunity due to inferential quality issues. The controller 106 receives predictive values for inferential sensors. The controller 106 measures the actual values for the inferential sensors. The controller 106 determines a bias of the inferential sensors based on an average and a standard deviation between the actual values and the predictive values.

Inferential or soft sensors can have issues in multiple ways. Inferential or soft sensors can have high variance or high bias. In some embodiments, inferential or soft sensors can have both high variance and bias.

Most inferential sensors are provided with a lab update or update from an analyzer. When an update does not occur, there is no way to figure out the issue with an inferential sensor.

If the inferential sensor generated is not noisy nor with high variability of bias between lab and predicted value, successive bias updates can gradually reduce the offset.

If the inferential sensor generated has high variability of bias, the result is high CV variability. High bias variability can be due to prediction variability or lab variability.

The controller 106 calculates the difference between lab value and predicted value. For example, more than 10 days of readings are used to effectively calculate the statistics.

The controller 106 calculates the average, standard deviation and other descriptive statistics of the bias.

With a better quality of inferential model, the control variables can operate closer to the limit. The average shift possible is calculated by extending the method defined by Martin and Turpin in Martin, G., L. Turpin, and R. Cline, *Estimating Control Function Benefits*, Hydrocarbon Processing, 68-73. 1991, the entirety of which is hereby incorporated by reference.

The controlled variable is corrected for the average shift and the objective function calculated in the shadow optimizer to estimate the loss due to inferential quality issue.

In operation 330, the controller 106 determines a cost of lost opportunity due to variable mode issues. The controller 106 detects a manipulated variable dropped from consideration. The controller 106 measures a current value of the dropped manipulated variable. The controller 106 determines an operating object function value based on real prices and data and limits collected from the field device. The controller 106 determines a dropped variable object function value based on accounting for the current value of the dropped controlled variable. The controller 106 determines the cost of lost opportunity based on a difference between the dropped variable object function value and the operating object function value.

As explained above, one of the reasons why advance process controller performance starts to deteriorate is when the manipulated or controlled variables that should be part of model matrix are dropped and do not participate in the optimization problem. Solving the problem in a generic way requires knowledge of the mode of operation and the variable status in each mode because some of the variables are designed to be dropped in certain modes of operation.

Collecting the mode of operation and setting the variable status properly in the shadow optimizer, the economic optimizer is solved to calculate the loss due to variable mode issues.

In operation 335, the controller 106 stores the costs of lost opportunities for the field device. The controller 106 compares each of the lost opportunities and presents on a display the information to users, such as a process control engineer and an operations manager, such that they can make effective decisions.

In certain embodiments, the controller 106 uses the costs of lost opportunities to adjust the operation of the field device automatically. The controller 106 determines adjusted operating values to decrease the costs of lost opportunities. The controller 106 then operates the field device using the adjusted values.

Although FIG. 3 illustrates one example of a method 300 for providing cost of lost opportunity to operators in real time using advance process control, various changes may be made to FIG. 3. For example, various steps shown in FIG. 3 could overlap, occur in parallel, occur in a different order, or occur any number of times.

It may be advantageous to set forth definitions of certain words and phrases used throughout this patent document. The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A field device for controlling a process comprising:
   a controller including a memory and a processor, wherein the processor is operably connected to the memory, the controller is configured to;
   determine a cost of lost opportunity in controlling the process for each of one or more types of issues including one or more of controlled variable variance issues, limit issues, model quality issues, inferential quality issues, and variable model issues, based at least in part on current values and/or average values of one or more controlled variables, wherein determining the cost of lost opportunity for each of one or more types of issues includes:
   the controller identifying an optimal operational performance of the field device in controlling the process;
   the controller identifying a current operational performance of the field device in controlling the process; and
   the controller determining the cost of lost opportunity for each of the one or more types of issues based on a difference between the optimal operational performance of the field device and the current operational performance of the field device;

the controller determining one or more adjusted operating values for the field device to decrease the costs of lost opportunity for each of the one or more types of issues in controlling the process, the controller setting the one or more adjusted operating values in the field device; and control the field device operation using the one or more adjusted operating values to control the process and decrease the costs of lost opportunity for each of the one or more types of issues.

2. The field device of claim 1, wherein the controller is configured to determine the costs of lost opportunity for controlled variable variance issues.

3. The field device of claim 2, wherein determining the cost of lost opportunity for controlled variable variance issues comprises:

determine an operating object function value based on real prices and data and limits collected from the field device;

determine a steady state object function value based on adjusting the controlled variables in a manner that an average value is equal to a steady state value for each of the controlled variables; and determine the cost of lost opportunity for controlled variable variance issues based on a difference between the steady state object function value and the operating object function value.

4. The field device of claim 1, wherein the controller is configured to determine the costs of lost opportunity for limit issues.

5. The field device of claim 4, wherein determining the cost of lost opportunity for limit issues comprises:

determine an economic object function value subject to a controlled variable range limit or a manipulated variable range limit;

determine a limit issues object function value by perturbing each end of the controlled variable range limit or the manipulated variable range limit for each variable; and determine the cost of lost opportunity for limit issues based on a difference between the limit issues object function value and the economic object function value.

6. The field device of claim 1, wherein the controller is configured to determine the costs of lost opportunity for model quality issues.

7. The field device of claim 6, wherein determining the cost of lost opportunity for model quality issues comprises:

determine an economic object function value subject to a controlled variable range limit and a manipulated variable range limit;

determine actual gains in the field device;

determine a model quality object function value based on the actual gains; and determine the cost of lost opportunity for model quality issues based on a difference between the model quality object function value and the economic object function value.

8. The field device of claim 1, wherein the controller is configured to determine the costs of lost opportunity for inferential quality issues.

9. The field device of claim 8, wherein determining the cost of lost opportunity for inferential quality issues comprises:

receive predictive values for an inferential sensor;

measure actual values for the inferential sensor;

determine a bias of the inferential sensor based on an average and a standard deviation of a difference between the actual values and the predictive values; and determine the cost of lost opportunity for inferential quality issues based on a shift of controlled variable associated with the inferential sensor to reduce the difference between the actual values and the predictive values.

10. The field device of claim 1, wherein the controller is configured to determine the costs of lost opportunity for variable model issues.

11. The field device of claim 10, wherein determining the cost of lost opportunity for variable model issues comprises:

detect a manipulated variable dropped from consideration;

measure a current value of the dropped manipulated variable;

determine an operating object function value based on real prices and data and limits collected from the field device;

determine a dropped variable object function value based on accounting for the current value of the dropped manipulated variable; and determine the cost of lost opportunity for dropped variables based on a difference between the dropped variable object function value and the operating object function value.

12. The field device of claim 1, wherein the controller is further configured to display a hierarchal list of variables that contribute to the costs of lost opportunity for each of the one or more types of issues.

13. The field device of claim 1, wherein the controller is configured to determine the adjusted operating values according to a variable having a highest contribution to the costs of lost opportunity for each of the one or more types of issues.

14. A method for controlling a process using a field device, the method comprising:

a controller receiving current values and/or average values for controlled variables and manipulated variables of the process;

the controller determining a cost of lost opportunity in controlling the process for each of one or more types of issues including one or more of controlled variable variance issues, limit issues, model quality issues, inferential quality issues, and variable model issues, based at least in part on the current values and/or the average values of the controlled variables, wherein determining the cost of lost opportunity for each of the one or more types of issues includes:

the controller identifying an optimal operational performance of the controller in controlling the process;

the controller identifying a current operational performance of the controller in controlling the process; and the controller determining the cost of lost opportunity for each of the one or more types of issues based on a difference between the optimal operational performance of the controller and the current operational performance of the controller;

the controller determining one or more adjusted operating values for the field device to decrease the costs of lost opportunity for each of the one or more types of issues in controlling the process;

the controller setting the one or more adjusted operating values in the field device; and control the field device operation using the one or more adjusted operating values to control the process and decrease the costs of lost opportunity for each of the one or more types of issues.

15. A non-transitory machine-readable medium encoded with executable instructions that, when executed, cause a controller for controlling a process using a field device to:

receive current values and/or average values for controlled variables and manipulated variables of the process;

determine a cost of lost opportunity in controlling the process for each of one or more types of issues including one or more of controlled variable variance issues, limit issues, model quality issues, inferential quality issues, and variable model issues, based at least in part on the current values and/or the average values of the controlled variables, wherein determining the cost of lost opportunity for each of the one or more types of issues includes:

identifying an optimal operational performance of the controller in controlling the process;

identifying a current operational performance of the controller in controlling the process; and determining the cost of lost opportunity for each of the one or more types of issues based on a difference between the optimal operational performance of the controller and the current operational performance of the controller;

determine one or more adjusted operating values for the field device to decrease the costs of lost opportunity for each of the one or more types of issues in controlling the process;

set the one or more adjusted operating values in the field device; and control the field device operation using the one or more adjusted operating values to control the process and decrease the costs of lost opportunity for each of the one or more types of issues.

16. The non-transitory machine-readable medium of claim 15, wherein determining the cost of lost opportunity includes determining the cost of lost opportunity for controlled variable variance issues, wherein determining the cost of lost opportunity for controlled variable variance issues comprises:

determine an operating object function value based on real prices and data and limits collected from the controller;

determine a steady state object function value based on adjusting the controlled variables in a manner that an average value is equal to a steady state value for each of the controlled variables; and determine the cost of lost opportunity for controlled variable variance issues based on a difference between the steady state object function value and the operating object function value.

17. The non-transitory machine-readable medium of claim 15, wherein determining the cost of lost opportunity includes determining the cost of lost opportunity for limit issues, wherein determining the cost of lost opportunity for limit issues comprises:

determine an economic object function value subject to a controlled variable range limit or a manipulated range limit;

determine a limit issues object function value by perturbing each end of the controlled variable range limit or the manipulated variable range limit for each variable; and determine the cost of lost opportunity for limit issues based on a difference between the limit issues object function value and the economic object function value.

18. The non-transitory machine-readable medium of claim 15, wherein determining the cost of lost opportunity includes determining the cost of lost opportunity for model quality issues, wherein determining the cost of lost opportunity for model quality issues comprises:

determine an economic object function value subject to a controlled variable range limit and a manipulated variable range limit;

determine actual gains in the controller;

determine a model quality object function value based on the actual gains; and determine the cost of lost opportunity for model quality issues based on a difference between the model quality object function value and the economic object function value.

19. The non-transitory machine-readable medium of claim 15, wherein determining the cost of lost opportunity includes determining the cost of lost opportunity for inferential quality issues, wherein determining the cost of lost opportunity for inferential quality issues comprises:

receive predictive values for an inferential sensor;

measure actual values for the inferential sensor;

determine a bias of the inferential sensor based on an average and a standard deviation of a difference between the actual values and the predictive values; and determine the cost of lost opportunity for inferential quality issues based on a shift of controlled variable associated with the inferential sensor to reduce the difference between the actual values and the predictive values.

20. The non-transitory machine-readable medium of claim 15, wherein determining the cost of lost opportunity includes determining the cost of lost opportunity for variable model issues, wherein determining the cost of lost opportunity for variable model issues comprises:

detect a manipulated variable dropped from consideration;

measure a current value of the dropped manipulated variable;

determine an operating object function value based on real prices and data and limits collected from the controller field device;

determine a dropped variable object function value based on accounting for the current value of the dropped manipulated variable; and determine the cost of lost opportunity for dropped variables based on a difference between the dropped variable object function value and the operating object function value.

* * * * *